United States Patent
Hansen et al.

(10) Patent No.: US 7,840,184 B2
(45) Date of Patent: Nov. 23, 2010

(54) METHOD AND SYSTEM FOR UTILIZING A 60 GHZ PHY LAYER FOR HIGH SPEED DATA TRANSMISSION BETWEEN BLUETOOTH DEVICES

(75) Inventors: Christopher Hansen, Sunnyvale, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 536 days.

(21) Appl. No.: 11/849,786

(22) Filed: Sep. 4, 2007

(65) Prior Publication Data

US 2008/0310332 A1    Dec. 18, 2008

Related U.S. Application Data

(60) Provisional application No. 60/943,990, filed on Jun. 14, 2007.

(51) Int. Cl.
*H04B 7/00* (2006.01)
(52) U.S. Cl. .................... 455/41.2; 455/41.3
(58) Field of Classification Search ............ 455/41.2, 455/41.3, 500, 513, 456.1; 370/464, 469
See application file for complete search history.

(56) References Cited

U.S. PATENT DOCUMENTS 7,594,010 B2 * 9/2009 Dohler et al. .............. 709/224
7,639,182 B2 * 12/2009 Schmidt et al. ............ 342/458

\* cited by examiner

*Primary Examiner*—Eugene Yun
(74) *Attorney, Agent, or Firm*—McAndrews, Held & Mallow, Ltd.

(57) ABSTRACT

Wireless devices may utilize a Bluetooth stack to setup a data transmission session between the devices. The data transmission session may comprise a Bluetooth PHY and/or MAC/PHY layer that enables the wireless devices to perform discovery, pairing, and security setup operations. A secondary physical layer may be utilized to perform high speed data transmission. The secondary physical layer may comprise a 60 GHz PHY and/or MAC/PHY. The secondary physical layer may be integrated via the Bluetooth stack, and applications running on top of the Bluetooth stack may utilize the secondary physical layer transparently. A portion of the transmitted data may be multiplexed onto other secondary physical layers that may be available in the wireless devices. Alternatively, transmission of data may comprise switching among available secondary physical layers. The Bluetooth PHY and/or MAC/PHY layer may be utilized during data transmission to continually monitor and/or manage the data transmission.

30 Claims, 4 Drawing Sheets

METHOD AND SYSTEM FOR UTILIZING A 60 GHZ PHY LAYER FOR HIGH SPEED DATA TRANSMISSION BETWEEN BLUETOOTH DEVICES

CROSS-REFERENCE TO RELATED APPLICATIONS/INCORPORATION BY REFERENCE

This patent application makes reference to, claims priority to and claims benefit from: U.S. Provisional Application Ser. No. 60/943,990 filed on Jun. 14, 2007.

This application also makes reference to: U.S. patent application Ser. No. 11/584,213 filed on Oct. 20, 2006.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable].

FIELD OF THE INVENTION

Certain embodiments of the invention relate to data transmission in wireless devices. More specifically, certain embodiments of the invention relate to a method and system for utilizing a 60 GHz PHY layer for high speed data transmission between Bluetooth devices.

BACKGROUND OF THE INVENTION

The field of wireless communication has seen dramatic growth the last few years. In today's world, most people use their wireless devices for various purposes, business and personal, on a constant and daily basis. Society is truly becoming a wireless one. A lot of wireless solutions have been introduced, and have made tremendous strides into everyday's life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth (BT) technology. While WPAN may be very beneficial for certain applications, other applications may require larger service areas and/or capabilities.

Many devices nowadays, including such devices as cellular phones, PDA's, and/or laptops, comprise wireless capabilities; including the Bluetooth protocol, which may be suitable for operations pertaining to interacting with other wireless devices that may be located within Bluetooth interface operational range. While wireless devices may have initially been intended solely for uses consistent with peer-to-peer communication, other applications and uses have appeared and/or gained popularity in recent years. These non-communicative operation may comprise audio/video applications such as still and moving picture recording application and voice recording applications. Though the Bluetooth interface may be suitable and/or optimal for communicative operations, its transmission data rates may prevent and/or limit the use of the Bluetooth interface for applications that may necessitate high transmission data rates, for example, video streaming.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing a 60 GHz PHY layer for high speed data transmission between Bluetooth devices, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing a 60 GHz PHY layer for high speed data transmission between Bluetooth devices. Wireless devices may be enabled to utilize a Bluetooth interface, and may utilize the Bluetooth interface for performing such operations as discovery, pairing, and/or security key initiation between such device utilizing the Bluetooth interface. However, the Bluetooth protocol may not be optimal for high speed data transmissions. While the wireless device may utilize the Bluetooth legacy stack to form a Bluetooth PHY and/or MAC/PHY connection that enables performing such operations, a secondary physical layer may be utilized for dedicated high speed data transmission where necessary. The secondary physical layer may comprise a 60 GHz PHY and/or MAC/PHY layer that may be managed through the Bluetooth stack to enable applications running within the Wireless devices, a top of the Bluetooth stack, to use the high speed data transmission offered by such secondary physical layers transparently. The 60 GHz PHY and/or MAC/PHY layer may be managed by the Bluetooth stack via a protocol adaptation layer/host controller interface (PAL/HCI) layer that enables transparent use of the secondary physical layer. The Bluetooth connection may be utilized throughout the data transmission over the 60 GHz PHY and/or MAC/PHY to continually monitor and/or manage the data transmission. Additionally, a portion of the transmitted data may be multiplexed onto other secondary physical layers that may be available in the Wireless devices. For example, WLAN (IEEE 802.11) and/or Ultra Wideband (UWB) may be utilized along with the 60 GHz PHY and/or MAC/PHY to perform required high speed data transmission. The Bluetooth stack may enable switching between available secondary physical layers during the data transmission. Signaling performed over the Bluetooth PHY and/or MAC/PHY may be utilized in performing any such data multiplexing and/or switching.

Figure 1:
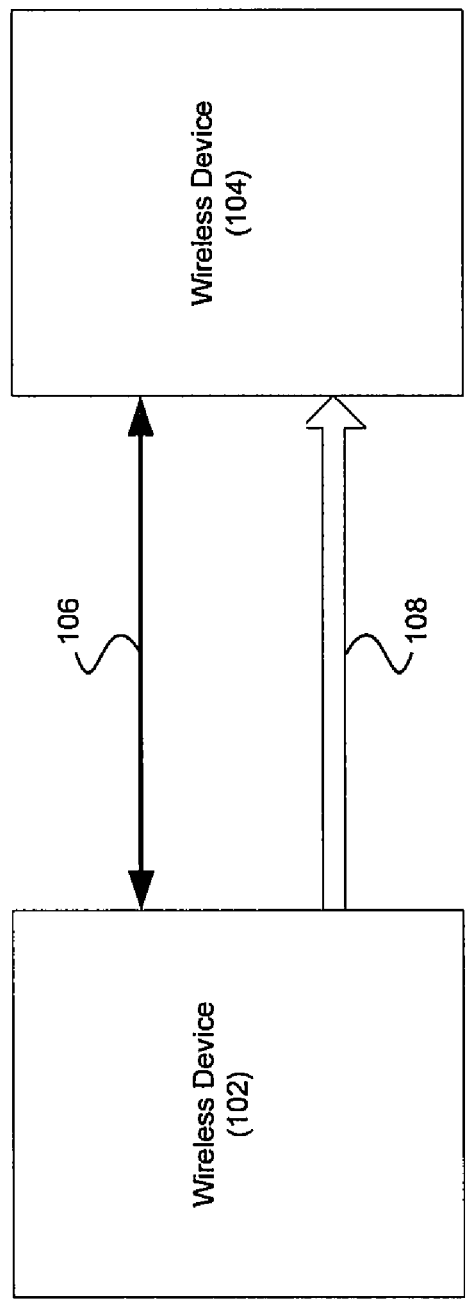
FIG. 1 is a block diagram illustrating two exemplary devices that transmit control signals over a Bluetooth connection and a high speed data signal over a secondary physical connection, in accordance with an embodiment of the invention.

FIG. 1 is a block diagram illustrating two exemplary devices that transmit control signals over a Bluetooth connection and a high speed data signal over a secondary physical connection, in accordance with an embodiment of the invention. Referring to FIG. 1, there is shown wireless devices 102 and 104, Bluetooth connection 106, and high speed data connection 108.

The wireless device 102 may comprise suitable logic, circuitry and/or code that may enable performing wireless mobile communication utilizing Bluetooth protocol (IEEE 802.15) and other wireless protocols. For example, the wireless device 102 may enable data communication via WLAN (IEEE 802.11), Ultra Wideband (UWB), and/or 60 GHz interfaces. The wireless device 102 may also comprise suitable logic, circuitry and/or code that may enable performing additional functionality that may necessitate generation and/or transmission of large data files. For example, the wireless device 102 may enable generation and/or transmission of video streaming and/or audio recordings.

The wireless device 104 may comprise suitable logic, circuitry and/or code that may enable communications with the wireless device 102. The invention may not be limited to a specific device, but may comprise for example, a general purpose processing device, a specialized processing device, and/or a specialized peripheral device which may be enabled to perform various jobs and/or tasks that may be requested by the wireless device 102. The wireless device 104 may comprise a personal computer (PC), a high-definition television (HDTV) set, a printer/scanner/fax device, a dedicate memory storage device, and/or a digital video recorder device. For example, the wireless device 104 may comprise a home PC that may be more capable or suitable of performing processing and/or storage operations of large data files than the wireless device 102 due to more powerful processing subsystems and/or increased memory space compared to the wireless device 102. Such home PC may be better suited to perform processing and/or storage intensive tasks that otherwise would have to be performed in the wireless device 102. Similarly, a networked HDTV monitor may be more suitable for displaying high definition multimedia content rather than the wireless device 102.

The Bluetooth connection 106 may comprise a Bluetooth radio link between wireless devices 102 and 104. The high speed data connection 108 may comprise a radio and/or wireless link between the wireless devices 102 and 104 that is based on a wireless protocol that may comprise 60 GHz, UWB, and/or 802.11. Additionally, the Bluetooth connection 106 and/or high speed data connection may comprise physical layers (PHY) and medium access control (MAC) layers functioning in wireless devices 102 and/or 104 to facilitate communication via the corresponding radio and/or wireless link. PHY layer correspond to the physical layer within the Open System Interface (OSI) model, which may enable transmitting raw bits via communication links. The MAC layer correspond to the medium access control sublayer of the Data Link layer within the OSI model; the MAC layer may enable controlling access to shared media networks, and may comprise addressing and/or channel control operations.

In operation, the wireless device 102 may need to perform high speed data transmission, for example, where large data files may have to be transmitted from the wireless device 102. Both wireless device 102 and 104 may be enabled to utilize Bluetooth protocol (IEEE 802.15). The Bluetooth protocol may enable efficient discovery, pairing, and initial setup functionality. The wireless device 102 may utilize discovery functionality of the Bluetooth protocol to discover local devices that may comprise Bluetooth interface. Once the wireless device 102 is enabled to discover the wireless device 104, the wireless devices 102 and 104 may utilize the Bluetooth protocol pairing functionality to establish the Bluetooth connection 106. The Bluetooth protocol, while it may be optimal for local discovery and/or pairing operations, may not be efficient and/or convenient for transfer of large data files because it may not enable large data bit rates.

The wireless device 102 may utilize the Bluetooth connection 106 to determine other wireless interfaces that the wireless device 104 may support. The wireless device 102 may then establish high speed data connection 108 utilizing one of the available wireless interfaces, which may enable transmission of data from wireless device 102 to the wireless device 104 at higher rates than available via the Bluetooth interface. For example, the wireless device 102 may determine that the wireless device 104 may support 60 GHz interface. The 60 GHz interface/protocol may enable high speed data transmission that may range from 2 to 10 Gbps (Gigabit per second). Consequently, the 60 GHz interface may be utilized to establish the high speed data connection 108. The Bluetooth connection 106 may be utilized during data transmission over the high speed transmission connection 108 to continually monitor and/or manage the data transmission.

Figure 2:
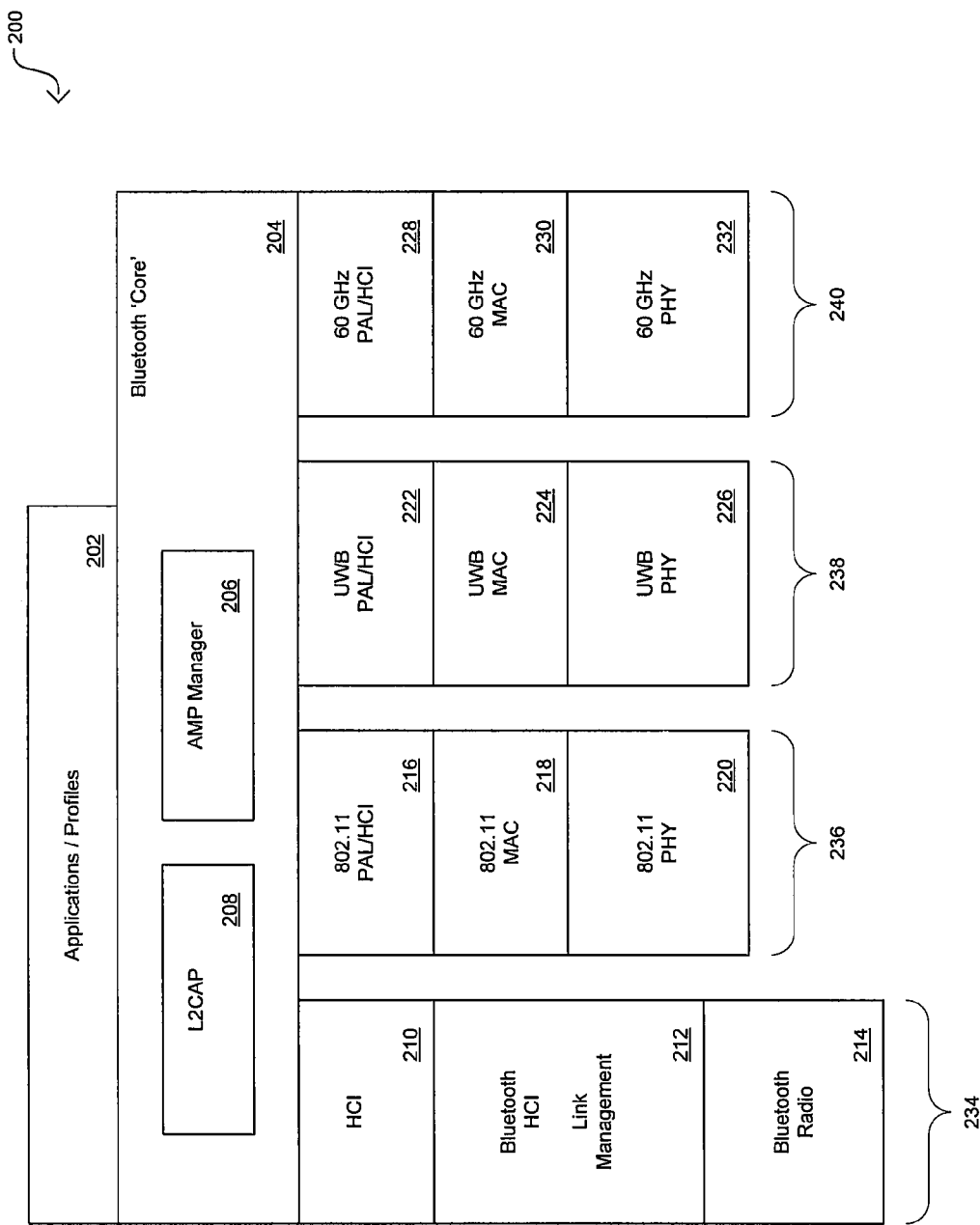
FIG. 2 is a block diagram illustrating a protocol stack diagram for Bluetooth that enables utilizing other physical layers for data transmissions, in accordance with an embodiment of the invention.

FIG. 2 is a block diagram illustrating a protocol stack diagram for Bluetooth that enables utilizing other physical layers for data transmissions, in accordance with an embodiment of the invention. Referring to FIG. 2, there is shown a Bluetooth stack 200 that may comprise applications/profiles layer 202, and a Bluetooth core 204. The Bluetooth core 204 may comprise a Logical Link Control and Adaptation Protocol (L2CAP) 206, and an alternate MAC/PHY Manager (AMP) 208. There is also shown a Bluetooth interface 234, an 802.11 interface 236, an ultra-wide band (UWB) interface 238, and a 60 GHz interface 240. The Bluetooth interface 234 may comprise a Bluetooth HCI interface 210, an HCI link management block 212, and a Bluetooth radio block 214. The 802.11 interface 236 may comprise an 802.11 PAL/HCI block 216, an 802.11 MAC 218, and an 802.11 PHY 220. The ultra-wide band (UWB) interface 238 may comprise an UWB PAL/HCI block 222, an UWB MAC 224, and an UWB PHY 226, The 60 GHz interface 240 may comprise a 60 GHz PAL/HCI block 228, a 60 GHz MAC 230, and a 60 GHz PHY 232. The 802.11 interface 234, the ultra-wide band (UWB) interface 238, and the 60 GHz interface 240 may be referred to as alternate interfaces.

The Bluetooth core 204 may be a link layer interface for Bluetooth communications. The Bluetooth core 204 may enable utilizing the Bluetooth interface 234 in instances where the Bluetooth radio 214 may be utilizes to transmit and/or receive data. The AMP 208 may enable connecting alternative interfaces that may incorporate non-Bluetooth MAC/PHY below the Bluetooth core layer to operate the Bluetooth applications and profiles at the top. In instances where other MAC/PHY interfaces may be utilized, a protocol adaptation layer/host controller interface (PAL/HCI) layers for each of the MAC/PHY interfaces may be utilized to enable utilizing non-Bluetooth radio interfaces to communicate data corresponding to applications running within the applications/profiles layer 202.

In operation, the Bluetooth stack 200 may be enabled to setup a data transmission session that may utilize secondary physical layer for high speed data transmission. During a Bluetooth discovery operation, a Bluetooth capable device that may be located in the neighborhood of another Bluetooth capable device may be able to recognize the other device, and vice versa. During a pairing process in Bluetooth, two Bluetooth-capable devices may decide that they want to communicate with each other and they may establish a secure key and start sharing information with each other. The pairing process may be performed over legacy Bluetooth radio. For example, the wireless devices 102 and 104 may utilize the Bluetooth core 204, the Bluetooth HCI 210, the Bluetooth HCI link management layer 212, and the Bluetooth radio 214 in performing discovery and/or pairing operations.

During data transmissions, the wireless device 102 and/or 104 may determine the type of connection, data rate and latency required for acceptable completion of the data transmission. In instances where a Bluetooth interface may not sufficiently enable performing the required data transmission, a secondary physical layer that may be better suited for the data transmission may be utilized.

In accordance with an embodiment of the invention, the 60 GHz interface may be utilized to perform data transmission. An application running on top of the Bluetooth stack 200, within the applications/profiles layer 202 may send the transmitted data. Consequently, the Bluetooth core 204 may enable transmission of the data wherein use of secondary, non-Bluetooth, physical layers may be made transparent. For example, the AMP manager 206 may enable managing and/or controlling data transmission via the 60 GHz interface. Within the 60 GHz PAL/HCI layer 228, the HCI functionality may be enabled to power the PAL functionality, and one or more data frames or packets that are output from the L2CAP layer 208 may be aggregated into large frames to fit into the 60 GHz MAC layer. The PAL layer may be enabled to aggregate frames received from the L2CAP layer. The PAL layer may be enabled to present an assessment of the channel quality to the AMP manager 206.

In another embodiment of the invention, there may be simultaneous connections over one or more MAC/PHY layers with one application running over Bluetooth enabling simultaneous utilization of multiple secondary physical layers. Transmitted data may be multiplexed over multiple connections to increase the quality of service. For example, the Bluetooth stack 200 may enable simultaneous use of the WLAN (IEEE 802.11), UWB, and 60 GHz interfaces. The 60 GHz interface 240 may be faster but it may be subject to dropouts or line of sight (LOS) interference problems. If there is a dropout on 60 GHz interface, the connection may not be lost completely because lower rate frames may be sent over the WLAN or the UWB connections. During a pairing process in Bluetooth, there may be a mapping of slots between two Bluetooth devices. The Bluetooth device attempting to transmit data may setup a link with a first Bluetooth device via the 60 GHz interface 240 while communicating with another Bluetooth device at a lower rate via another alternate interface such as the 802.11 interface 236 and/or the UWB interface 238.

Where simultaneous connectivity over available secondary physical layers, the Bluetooth stack 200 may enable switching among available secondary physical layers during a data transmission session to ensure completion of the data transmission. For example, where issues may arise during data transmission over the 60 GHz interface, the Bluetooth stack 200 may enable switching to the WLAN (802.11) interface to ensure continuing the data transmission.

Figure 3:
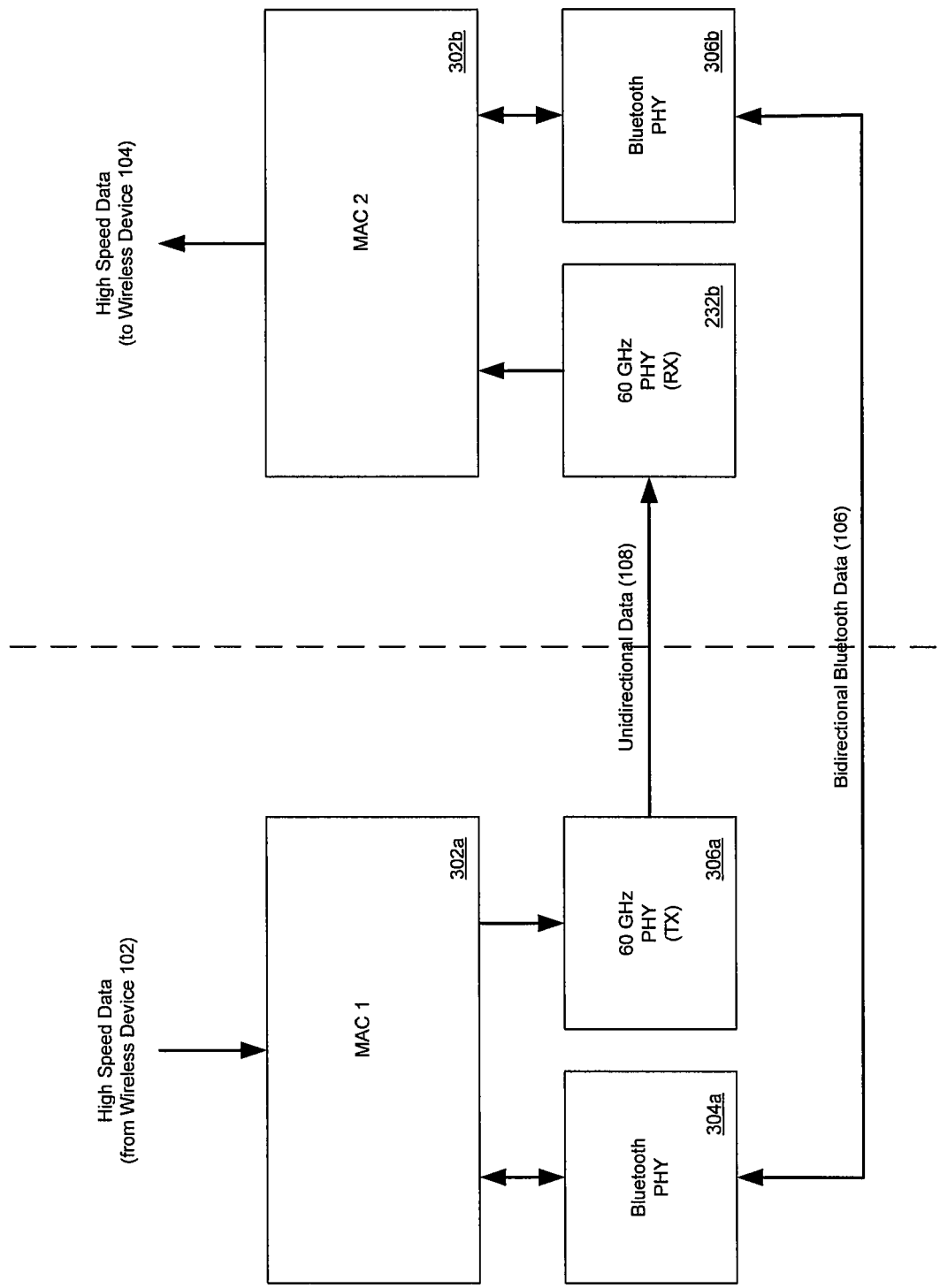
FIG. 3 is a block diagram illustrating a single media access control (MAC) address and two physical layers, Bluetooth and 60 GHz, used by each of two wireless devices to facilitate transmission of high speed data, in accordance with an embodiment of the invention.

FIG. 3 is a block diagram illustrating a single media access control (MAC) address and two physical layers, Bluetooth and 60 GHz, used by each of two wireless devices to facilitate transmission of high speed data, in accordance with an embodiment of the invention. Referring to FIG. 3, there is shown the wireless devices 102 and 104 communicating data via data transmission session.

Device 102 utilizes a MAC layer 302a and two physical layers, a Bluetooth PHY 304a and a 60 GHz PHY layer 306a. The Bluetooth PHY layer 304a may be comprised substantially similar to the Bluetooth PHY layer 214 as described in FIG. 2, and may enable data transmission based on Bluetooth protocol. The 60 GHz PHY 306a may be substantially similar to the 60 GHz PHY layer as described in FIG. 2, and may enable high speed data transmission at a bandwidth centered at approximately 60 GHz. Device 104 utilizes a MAC layer 302b and two physical layers, a Bluetooth PHY 304b and a 60 GHz PHY layer 306b. The Bluetooth PHY layer 304b may be comprised substantially similar to the Bluetooth PHY layer 214 as described in FIG. 2, and may enable data transmission based on Bluetooth protocol. The 60 GHz PHY 306b may be substantially similar to the 60 GHz PHY layer as described in FIG. 2, and may enable high speed data transmission at a bandwidth centered at approximately 60 GHz.

The 60 GHz PHY layers 306a and 306b may be configured for transmission in only one direction as a means for providing uninterrupted unidirectional data transmission from one device to the other. However, the Bluetooth physical layers 304a and 304b may be used for providing one or more bidirectional control signals between the two devices. The bidirectional control signals may carry device management data such as configuration, timing, and/or control data. The one or more control signals may facilitate authentication and association of devices, assignment of a communication channel for transmitting high speed data between the two devices, and may also facilitate antenna training and setup for the two devices. The communication channel may be implemented using the second physical layers 306a and 306b provided in the two devices. The communication channel may be used to carry the high speed data that is transmitted unidirectionally from the first device to the second device. The second physical layer 232 may transmit the high speed data using a frequency division multiple access (FDMA) or a time division multiple access (TDMA) protocol. In a representative embodiment, the high speed data may be transmitted at rates of up to approximately 10 Gbps.

In operation, the device 102 may be required to transmit data at high rates, which may not be suitably handled using Bluetooth. The device 102 may utilize Bluetooth protocol, via MAC layer 302a and Bluetooth PHY 304a to perform Bluetooth discovery operations. Consequently, the device 102 may discover the device 104 and may determine it to be a suitable target of the requested data transmission. The devices 102 and 104 may utilize their respective MAC layers 302a and 302b, and the Bluetooth PHY layers 304a and 304b to establish the Bluetooth connection 106, which may enable performing connection setup operations that may comprise pairing and/or security key initialization. The device 102 and 104 may then setup a high speed data connection 108 via their respective MAC layers 302a and 302b, and the 60 GHz PHY layers 306a and 306b. Once the high speed data connection 108 is established, the device 102 may transmit high speed data to the device 104 over the high speed data connection 108. The transmission of the high speed data may comprise use of the MAC layers 302a and 302b, and the 60 GHz PHY layers 306a and 306b.

In another embodiment of the invention, the Bluetooth connection may be utilized during the data transmission over the high speed data connection 108 to continually monitor and/or manage the data transmission. The device 102 and 104 may exchange necessary control messages over the Bluetooth connection during the transmission of data over the high speed data connection 108.

Figure 4:
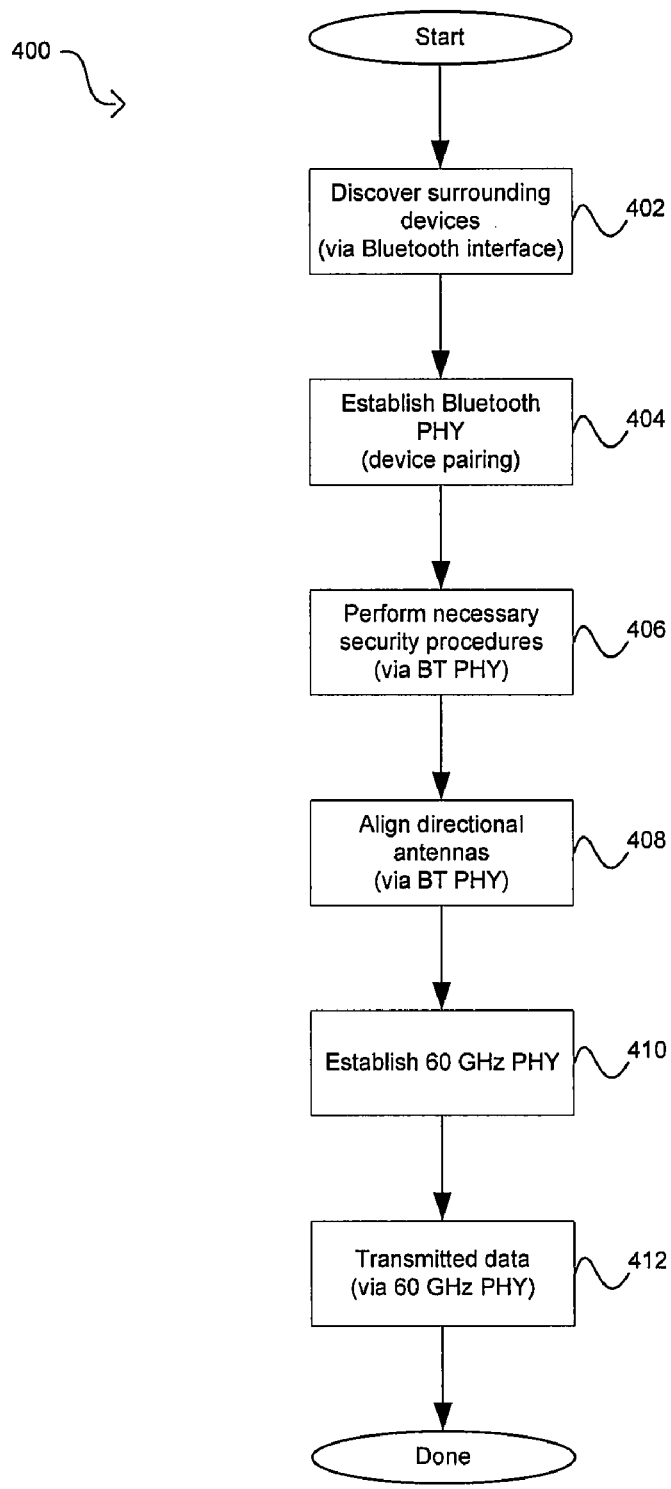
FIG. 4 is an exemplary flow diagram illustrating use of Bluetooth and 60 GHz physical layers to facilitate transmission of high speed data between Bluetooth-enabled devices, in accordance with an embodiment of the invention.

FIG. 4 is an exemplary flow diagram illustrating use of Bluetooth and 60 GHz physical layers to facilitate transmission of high speed data between Bluetooth-enabled devices, in accordance with an embodiment of the invention. Referring to FIG. 4, there is shown a flow chart 400 comprising a plurality of exemplary steps. In step 402 a wireless device may utilize the Bluetooth protocol to perform discovery operations wherein other wireless devices within operational proximity of Bluetooth interface may be detected and/or contacted. For example, the wireless device 102 may utilize a legacy Bluetooth stack comprising the Bluetooth core 204, the Bluetooth HCI 210, the Bluetooth HCI Link management layer 212, and the Bluetooth radio to perform such discovery operations. In step 404, a Bluetooth PHY may be established. For example, the wireless device 102, having discovered the wireless device 104 in step 402, may establish the Bluetooth connection 106 utilizing the Bluetooth legacy stack 200 and/or Bluetooth PHY layers in both devices, substantially as described in FIG. 3.

In step 406, necessary security operations may be performed. For example, the Bluetooth connection 106 may be utilized to setup and/or exchange security keys that may be utilized to encrypt and/or decrypt data transmitted between the wireless devices 102 and 104. In step 408, a directional antenna may be aligned. While Bluetooth communication may be performed utilizing an Omni-directional antenna, high speed data transmission may be performed via a directional antenna that may enable efficient and/or optimal communication because less power may be utilized to guaranteed reception of data at target end. The Bluetooth connection 106 may be utilized to perform the directional antenna alignment. The wireless devices 102 and 104 may utilize the Bluetooth connection 106 to exchange necessary signaling messages that may ensure coordinating the alignment of their respective directional antennas.

In step 410, the 60 GHz secondary physical layer may be established. For example, the wireless device 102 may utilize the Bluetooth stack 200 to establish a 60 GHz connection with the wireless device 104 via the 60 GHz MAC layer 230 and the 60 GHz PHY layer 232. In step 412, a high speed transmission may be performed via the 60 GHz physical layer established in step 410. In another embodiment of the invention, at least a portion of the transmitted data may be multiplexed onto other secondary physical layers that may be established between the wireless devices 102 and 104. For example, a portion of the data transmitted may be multiplexed onto WLAN MAC/PHY layers 218 and 220 and/or the UWB MAC/PHY layers 224 and 226. Alternatively, the wireless devices 102 and 104 may switch among available secondary physical layers in the course of the high speed data transmission. The Bluetooth connection 106 may be utilized throughout the high speed data transmission to continually monitor and/or manage the data transmission.

Various embodiments of the invention may comprise a method and system for utilizing a 60 GHz PHY layer for high speed data transmission between Bluetooth devices. Wireless devices 102 and 104 may be enabled to utilize the Bluetooth stack 200. The Bluetooth stack 200 may be utilized for performing such operations as discovery, pairing, and/or security key initiation between the wireless devices 102 and 104 utilizing a Bluetooth interface. The wireless devices 102 and 104 may form a Bluetooth connection 106 utilizing MAC layers 302a and 302b, and Bluetooth PHY layers 304a and 304b in order to enable performing the discovery, pairing, and/or key security initiation operations. In certain instances, the Bluetooth protocol may not be optimal for handling high speed data transmissions. In this regard, the wireless devices 102 and 104 may utilize the Bluetooth connection 106 for basic connectivity operations, while the high speed data connection 108, comprising a secondary physical layer, may be more suitable for dedicated high speed data transmission. The secondary physical layer may comprise 60 GHz PHY and/or MAC/PHY layers that may be managed through the Bluetooth stack 200 to enable applications running within the wireless devices 102 and 104 to use the high speed data transmission offered by such secondary physical layers transparently. The 60 GHz PHY and/or MAC/PHY layer may be managed by the Bluetooth stack 200 via AMP manager 206 and 60 GHz PAL/HCI layer 228 that may enable transparent use of the secondary physical layer. The Bluetooth connection 106 may be utilized throughout the data transmission over the 60 GHz PHY and/or MAC/PHY to continually monitor and/or manage the data transmission. Additionally, a portion of the transmitted data may be multiplexed onto other secondary physical layers that may be available in the Wireless devices. For example, WLAN (IEEE 802.11) and/or Ultra Wideband (UWB) may be utilized along with the 60 GHz PHY and/or MAC/PHY to perform required high speed data transmission. Alternatively, the Bluetooth stack may enable switching between all available secondary physical layers during the data transmission. Signaling performed over the Bluetooth PHY and/or MAC/PHY may be utilized in performing any such data multiplexing and/or switching.

Another embodiment of the invention may provide a machine-readable storage, having stored thereon, a computer program having at least one code section executable by a machine, thereby causing the machine to perform the steps as described herein for utilizing a 60 GHz PHY layer for high speed data transmission between Bluetooth devices.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of data transmission between wireless devices comprising:
   in a first wireless device that comprises a single Bluetooth stack that is utilized to manage a Bluetooth radio interface that is accessed via a Bluetooth physical layer and to manage a plurality of non-Bluetooth radio interfaces that are accessed via a corresponding plurality of non-Bluetooth medium access control (MAC)/physical layer (PHY) layers:
      when said Bluetooth radio interface cannot perform a required data communication, setting up, utilizing said Bluetooth physical layer, a data transmission session between said first wireless device and a second wireless device; and
      communicating data during said data transmission session using said single Bluetooth stack via one or more 60 GHz MAC/PHY layers that enable accessing a 60 GHz radio interface between said first wireless device and said second wireless device.

2. The method according to claim 1, comprising performing pairing, discovery, and/or securing of said data transmission session via said Bluetooth physical layer during said setup of said data transmission session.

3. The method according to claim 2, wherein said securing of said data transmission session comprises security key establishment.

4. The method according to claim 1, wherein each of said first device and said second device utilizes a single MAC (media access control) address for said data transmission session.

5. The method according to claim 1, wherein said Bluetooth physical layer operates in burst mode.

6. The method according to claim 1, wherein said 60 GHz radio interface operates in non-burst mode.

7. The method according to claim 1, comprising setting up utilizing said single Bluetooth stack and said Bluetooth physical layer, one or more other non-Bluetooth radio interfaces, each of which is accessed via corresponding MAC/PHY layers, to be utilized by said data transmission session between said first wireless device and said second wireless device.

8. The method according to claim 7, wherein said one or more other non-Bluetooth radio interfaces operate at higher transmission rates than said Bluetooth radio interface.

9. The method according to claim 7, wherein said one or more other non-Bluetooth radio interfaces comprise WLAN and Ultra Wideband (UWB) radio interfaces.

10. The method according to claim 7, comprising multiplexing at least a portion of said transmitted data onto said one or more other non-Bluetooth radio interfaces.

11. The method according to claim 7, comprising switching among said 60 GHz radio interface and said one or more other non-Bluetooth radio interfaces during said transmission of data.

12. The method according to claim 11, comprising switching among said 60 GHz radio interface and said one or more other non-Bluetooth radio interfaces based on bandwidth requirements of said data transmission session.

13. The method according to claim 1, wherein said communication of said data between said first wireless device and said second wireless device via one or more of said non-Bluetooth radio interfaces occurs transparently.

14. The method according to claim 1, comprising dynamically managing said data transmission session between said first wireless device and said second wireless device via said Bluetooth physical layer.

15. The method according to claim 1, comprising determining when said Bluetooth radio interface cannot perform a required data communication based on a type of connection, a data rate, and/or a required latency.

16. A system for data transmission between wireless devices, the system comprising:
   one or more processors in a first wireless device that comprises a single Bluetooth stack that is utilized to manage a Bluetooth radio interface that is accessed via a Bluetooth physical layer and to manage a plurality of non-Bluetooth radio interfaces that are accessed via a corresponding plurality of non-Bluetooth medium access control (MAC)/physical layer (PHY) layers, said one or more processor are operable to:
      when said Bluetooth radio interface cannot perform a required data communication, set up, utilizing said Bluetooth physical layer, a data transmission session between said first wireless device and a second wireless device; and
      communicate data during said data transmission session using said single Bluetooth stack via one or more 60 GHz MAC/PHY layers that enable accessing a 60 GHz radio interface between said first wireless device and said second wireless device.

17. The system according to claim 16, wherein said one or more processors perform pairing, discovery, and/or securing of said data transmission session via said Bluetooth physical layer during said setup of said data transmission session.

18. The system according to claim 17, wherein said securing of said data transmission session comprises security key establishment.

19. The system according to claim 16, wherein each of said first device and said second device utilizes a single MAC (media access control) address for said data transmission session.

20. The system according to claim 16, wherein said Bluetooth physical layer operates in burst mode.

21. The system according to claim 16, wherein said 60 GHz radio interface operates in non-burst mode.

22. The system according to claim 16, wherein said one or more processors set up utilizing said single Bluetooth stack and said Bluetooth physical layer, one or more other non-Bluetooth radio interfaces, each of which is accessed via corresponding MAC/PHY layers, to be utilized by said data transmission session between said first wireless device and said second wireless device.

23. The system according to claim 22, wherein said one or more other non-Bluetooth radio interfaces operate at higher transmission rates than said Bluetooth radio interface.

24. The system according to claim 22, wherein said one or more other non-Bluetooth radio interfaces comprise WLAN and Ultra Wideband (UWB) radio interfaces.

25. The system according to claim 22, wherein said one or more processors enable multiplexing at least a portion of said transmitted data onto said one or more other non-Bluetooth radio interfaces.

26. The system according to claim 22, wherein said one or more processors enable switching among said 60 GHz radio interface and said one or more other non-Bluetooth radio interfaces during said transmission of data.

27. The system according to claim 26, wherein said one or more processors enable switching among said 60 GHz radio interface and said one or more other non-Bluetooth radio interfaces based on bandwidth requirements of said data transmission session.

28. The system according to claim 16, wherein said communication of said data between said first wireless device and said second wireless device via one or more of said non-Bluetooth radio interfaces occurs transparently.

29. The system according to claim 16, wherein said one or more processors enable dynamically managing said data transmission session between said first wireless device and said second wireless device said Bluetooth physical layer.

30. The system according to claim 16, wherein said one or more processors are operable to determine when said Bluetooth radio interface cannot perform a required data communication type of connection, a data rate, and/or a required latency.

\* \* \* \* \*